(12) United States Patent
Mori et al.

(10) Patent No.: US 7,955,578 B2
(45) Date of Patent: Jun. 7, 2011

(54) METHOD AND APPARATUS FOR TREATING GAS CONTAINING FLOURINE-CONTAINING COMPOUNDS

(75) Inventors: Yoichi Mori, Tokyo (JP); Tadakazu Nishikawa, Tokyo (JP); Masaaki Osato, Tokyo (JP); Saburou Nagano, Kokubu (JP); Yoshihiro Tanabe, Kokubu (JP)

(73) Assignee: Ebara Corporation, Tokyo (JP)

( * ) Notice: Subject to any disclaimer, the term of this patent is extended or adjusted under 35 U.S.C. 154(b) by 955 days.

(21) Appl. No.: 10/593,312

(22) PCT Filed: Mar. 18, 2005

(86) PCT No.: PCT/JP2005/005627
§ 371 (c)(1),
(2), (4) Date: Jun. 28, 2007

(87) PCT Pub. No.: WO2005/089909
PCT Pub. Date: Sep. 29, 2005

(65) Prior Publication Data
US 2007/0264188 A1  Nov. 15, 2007

(30) Foreign Application Priority Data

Mar. 19, 2004  (JP) ................................. 2004-080249

(51) Int. Cl.
*B01D 53/62* (2006.01)
*B01D 53/68* (2006.01)
*B01D 53/70* (2006.01)
*C01F 11/22* (2006.01)

(52) U.S. Cl. .............. 423/245.3; 423/245.1; 423/240 S; 423/240 R; 423/490; 588/313; 588/316; 588/320; 588/400

(58) Field of Classification Search .............. 423/240 R, 423/240 S, 245.1, 245.3, 490; 588/313, 316, 588/320, 400
See application file for complete search history.

(56) References Cited

U.S. PATENT DOCUMENTS

| 3,845,191 | A  | * | 10/1974 | Bruce, Jr. ................. | 423/240 R |
| 4,042,667 | A  | * | 8/1977  | Ishiwata et al. ........... | 423/240 R |
| 6,309,618 | B1 | * | 10/2001 | Ohira et al. ............... | 423/240 R |
| 6,949,225 | B1 | * | 9/2005  | Mori et al. ................ | 422/173 |

(Continued)

FOREIGN PATENT DOCUMENTS

| JP | 9-10764 | 1/1997 |
| JP | 9 24243 | 1/1997 |

(Continued)

*Primary Examiner* — Ngoc-Yen M Nguyen
(74) *Attorney, Agent, or Firm* — Oblon, Spivak, McClelland, Maier & Neustadt, L.L.P.

(57) ABSTRACT

To provide a method and apparatus for treating a waste gas containing fluorine-containing compounds, according to which PFCs can be decomposed efficiently even at low temperature, and moreover fluorine from the product of the decomposition can be recovered for reuse efficiently. An embodiment of the present invention relates to a method of treating a gas containing a fluorine-containing compound, comprising contacting the gas with a treatment agent comprising a mixture of aluminum hydroxide and calcium hydroxide. Moreover, another embodiment of the present invention relates to an apparatus for treating a gas containing a fluorine-containing compound, comprising a treatment column comprising a hollow interior that is packed with a treatment agent comprising a mixture of aluminum hydroxide and calcium hydroxide and through which the gas can pass, heating means capable of heating the hollow interior to a prescribed temperature, a gas introduction port for introducing the gas to be treated into the hollow interior, and an exhaust pipe for discharging gas produced from the hollow interior.

6 Claims, 1 Drawing Sheet

U.S. PATENT DOCUMENTS 6,960,552 B2 11/2005 Otsuka et al.
2003/0026743 A1* 2/2003 Imamura .................... 422/173

FOREIGN PATENT DOCUMENTS

| JP | 2000-157837 | 6/2000 |
| JP | 2000 254438 | 9/2000 |
| JP | 2001-190959 | 7/2001 |
| JP | 2002-224565 | 8/2002 |
| JP | 2002-370013 | 12/2002 |
| JP | 2003-71244 | 3/2003 |
| JP | 2003-181286 | 7/2003 |
| JP | 2003-311122 | 11/2003 |
| JP | 2004 330058 | 11/2004 |
| WO | WO 02058824 A1 * | 8/2002 |

* cited by examiner

METHOD AND APPARATUS FOR TREATING GAS CONTAINING FLOURINE-CONTAINING COMPOUNDS

TECHNICAL FIELD

The present invention relates to treatment of a gas containing fluorine-containing compounds. In particular, the present invention relates to a method and apparatus for treating a waste gas containing fluorine-containing compounds, especially PFCs, discharged from a process of dry cleaning the inner surface of a semiconductor manufacturing apparatus or the like or a process of etching any of various films such as an oxide film in the semiconductor industry. Furthermore, the present invention relates to a method and apparatus for treating a waste gas enabling decontamination treatment to be carried out efficiently on a waste gas containing fluorine-containing compounds and also an oxidizing gas such as $F_2$, $Cl_2$ or $Br_2$, an acidic gas such as HF, HCl, HBr, $SiF_4$, $SiCl_4$, $SiBr_4$ or $COF_2$, or CO. Moreover, in another aspect of the present invention, the present invention relates to a method and apparatus for recovering fluorine from a gas containing fluorine-containing compounds.

PRIOR ART

In the semiconductor industry, a whole variety of harmful gases are used in semiconductor manufacturing processes, and there is a fear of environmental pollution due to these being discharged into the environment. In particular, in processes of cleaning the inner surfaces of semiconductor manufacturing apparatuses, etching processes, CVD processes and-so on in the semiconductor industry, fluorine-containing compounds such as fluorinated hydrocarbons such as $CHF_3$ and perfluoro compounds (PFCs) such as $CF_4$, $C_2F_6$, $C_3F_8$, $C_4F_6$, $C_4F_8$, $C_5F_8$, $SF_6$ and $NF_3$ are used, and it is considered to be an urgent task to establish systems for removing such fluorine-containing compounds contained in waste gases from such processes since these fluorine-containing compounds contribute to global warming.

As methods of treating a waste gas containing fluorine-containing compounds, for example a method in which fluorocarbons in a waste gas are decomposed using a treatment agent comprising aluminum oxide and an alkaline earth metal oxide (Japanese Patent Application Laid-open No. 2002-224565); a method in which sulfur fluoride in a waste gas is decomposed using a treatment agent comprising aluminum oxide and an alkaline earth metal oxide (Japanese Patent Application Laid-open No. 2002-370013); a method in which fluorocarbons in a waste gas are decomposed using a treatment agent comprising aluminum oxide and a lithium compound (Japanese Patent Application Laid-open No. 2003-71244); a method in which fluorine compounds in a waste gas are decomposed using a treatment agent comprising alumina and an alkaline earth metal compound, and in some cases an oxide of a metal such as copper, tin or vanadium (Japanese Patent Application Laid-open No. 2001-190959); a method in which halogenated gases in a waste gas are decomposed using a treatment agent constituted from calcium oxide or magnesium oxide containing an alkali metal chloride, an alkaline earth metal chloride or an alkali metal fluoride (Japanese Patent Application Laid-open No. 2000-157837); and so on have been proposed.

DISCLOSURE OF THE INVENTION

Problem to be Solved by the Invention

However, with prior treatment methods such as the above, there has been a problem that the treatment temperature is as high as 800 to 1000° C., and hence deterioration of the treatment apparatus through heat is rapid, and moreover the energy consumption of the apparatus is high. Moreover, prior treatment agents have had the problem that the useful life thereof is short and hence the frequency of replacement must be high. For example, with the methods disclosed in the above-mentioned Japanese Patent Application Laid-open Nos. 2002-224565, 2002-370013 and 2003-71244, PFCs are decomposed by reacting the PFCs with aluminum oxide (alumina) to produce aluminum fluoride. However, aluminum oxide has a low reactivity, and hence to make this reaction proceed efficiently, high-temperature reaction conditions are required. Furthermore, there is a problem that the aluminum fluoride produced forms a layer on the surface of the aluminum oxide, whereby the aluminum oxide is poisoned and loses catalytic activity in a short time, and hence the frequency of replacement of the treatment agent must be high.

Furthermore, in recent years, depletion of the resource fluorite, which is a raw material of fluorine, has become a problem, and hence recovery and reuse of fluorine has become an important issue; however, in the case of decomposing PFCs to produce aluminum fluoride, because aluminum fluoride is a compound that will not dissolve in water, acids or alkalis, recovering the fluorine from the aluminum fluoride is difficult in terms of both cost and technology.

It is an object of the present invention to resolve these problems of the prior art, and provide a method and apparatus for treating a waste gas containing fluorine-containing compounds, according to which PFCs can be decomposed efficiently even at low temperature, and moreover fluorine from the product of the decomposition can be recovered for reuse efficiently.

MEANS FOR SOLVING THE PROBLEM

Figure 1:
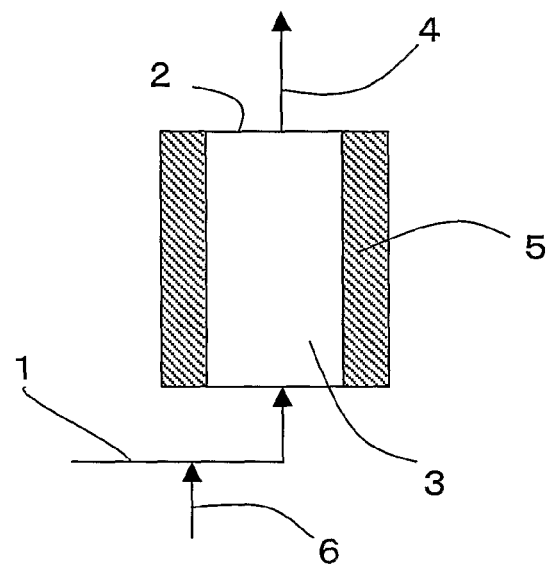
FIG. 1 is a conceptual drawing of a gas treatment apparatus according to an embodiment of the present invention.

The present inventors carried out assiduous studies to develop a novel waste gas treatment method that resolves the above problems, and as a result discovered that by reacting PFCs with aluminum hydroxide, thus converting the fluorine into hydrogen fluoride through the hydrogen in the hydroxyl groups of the aluminum hydroxide, and then reacting the hydrogen fluoride produced with calcium hydroxide to produce calcium fluoride, fluorine-containing compounds such as PFCs can be decomposed efficiently at a lower temperature than with prior methods; the present inventors thus arrived at the present invention. Specifically, one embodiment of the present invention relates to a method of treating a gas containing a fluorine-containing compound, comprising contacting the gas with a treatment agent comprising a mixture of aluminum hydroxide and calcium hydroxide.

Examples of fluorine-containing compounds that can be treated using the method of the present invention include fluorinated hydrocarbons such as $CHF_3$ and perfluoro compounds (PFCs) such as $CF_4$, $C_2F_6$, $C_3F_8$, $SF_6$ and $NF_3$. Examples of gases containing such fluorine-containing compounds include waste gases discharged in processes of dry cleaning the inner surfaces of semiconductor manufacturing apparatuses or the like and processes of etching various films in the semiconductor industry.

Moreover, according to the method of the present invention, in addition to PFCs or the like, oxidizing gases, acidic gases and so on can also be decomposed. Another embodiment of the present invention thus relates to a method of carrying out decontamination treatment on a gas containing at least one selected from the group consisting of fluorine-containing compounds, oxidizing gases and acidic gases, comprising contacting the gas with a treatment agent comprising a mixture of aluminum hydroxide and calcium hydroxide.

A waste gas discharged from a semiconductor manufacturing process may contain not only PFCs but also at least one selected from the group consisting of oxidizing gases such as $F_2$, $Cl_2$ and $Br_2$ and acidic gases such as HF, $SiF_4$, $COF_2$, HCl, HBr, $SiCl_4$ and $SiBr_4$. Oxidizing gases such as $F_2$, $Cl_2$ and $Br_2$ cannot be completely treated with only water in the case of carrying out wet treatment, but rather an alkaline agent or a reducing agent must be used, and hence there have been problems such as management or the apparatus becoming complex, and the cost being high. According to the method of the present invention, such oxidizing gases and acidic gases can be decomposed together with the fluorine-containing compounds such as PFCs.

Moreover, a waste gas discharged from a semiconductor manufacturing process may contain CO, and furthermore CO may be produced as a byproduct during PFC decomposition; it is thus necessary to decompose and remove this CO. According to a method of another embodiment of the present invention, in addition to fluorine-containing compounds, oxidizing gases and acidic gases, CO can also be decomposed and removed. In this case, oxygen may be added to the gas to be treated, whereby the CO can be decomposed. In this case, the timing of adding the oxygen may be before the gas to be treated is made to contact with the treatment agent comprising a mixture of aluminum hydroxide and calcium hydroxide, or while the gas to be treated and the treatment agent are in contact with one another. That is, another embodiment of the present invention relates to a method of carrying out decontamination treatment on a gas containing at least one selected from the group consisting of fluorine-containing compounds, oxidizing gases, acidic gases and CO, comprising adding oxygen to the gas and contacting the gas with a treatment agent comprising a mixture of aluminum hydroxide and calcium hydroxide.

According to the method of the present invention, the fluorine-containing compounds and so on in the gas to be treated are first reacted with aluminum hydroxide and thus converted into HF, and then this HF is reacted with calcium hydroxide to produce calcium fluoride. The reactions in the case that $CF_4$ as a PFC, $F_2$ as an oxidizing gas and $SiF_4$ as an acidic gas in the waste gas are decomposed using the method of the present invention are shown below.

Decomposition of $CF_4$ $3CF_4 + 4Al(OH)_3 \rightarrow 2Al_2O_3 + 12HF + 3CO_2$ $6Ca(OH)_2 + 12HF \rightarrow 6CaF_2 + 12H_2O$ Decomposition of $F_2$ $6F_2 + 4Al(OH)_3 \rightarrow 2Al_2O_3 + 12HF + 3O_2$ $6Ca(OH)_2 + 12HF \rightarrow 6CaF_2 + 12H_2O$ Decomposition of $SiF_4$ $3SiF_4 + 4Al(OH)_3 \rightarrow 2Al_2O_3 + 12HF + 3SiO_2$ $6Ca(OH)_2 + 12HF \rightarrow 6CaF_2 + 12H_2O$ Moreover, in the case of decomposing CO that is in the gas to be treated or is produced during the treatment reaction, oxygen is added to the gas to be treated, and the gas is made to contact with the treatment agent comprising a mixture of aluminum hydroxide and calcium hydroxide. The CO is oxidatively decomposed into $CO_2$ by the oxygen in the contact reactor (see the following formula).

$2CO + O_2 \rightarrow 2CO_2$

Note that in this case, the timing of adding the oxygen to the gas to be treated may be before the gas to be treated is made to contact with the treatment agent, or while the gas to be treated and the treatment agent are in contact with one another.

With the method of the present invention, unlike in the conventional case of using aluminum oxide, the fluorine-containing compounds and so on are reacted with aluminum hydroxide, thus decomposing the fluorine-containing compounds into HF, and then the HF produced is reacted with calcium hydroxide and thus converted into calcium fluoride. According to the studies of the present inventors, it has been found that aluminum hydroxide has a higher reactivity with fluorine-containing compounds than the conventionally used aluminum oxide, and hence the reaction can be made to proceed efficiently at a lower temperature than with a conventional method. Deterioration of the reaction apparatus through heat due to using a high temperature can thus be suppressed, and moreover the energy consumption of the apparatus can be reduced.

Moreover, as can be seen from the above formulae, when a waste gas containing fluorine-containing compounds is treated using a mixture of aluminum hydroxide and calcium hydroxide according to the method of the present invention, PFCs, acidic gases and so on are decomposed producing aluminum oxide ($Al_2O_3$) and calcium fluoride ($CaF_2$). Calcium fluoride is the principal constituent of fluorite, which is known as a raw material in fluorine manufacture, and can be treated with an acid to produce fluorine gas. According to the method of the present invention, fluorine can thus be recovered in a reusable form very efficiently from a gas containing fluorine-containing compounds.

The present invention is characterized in that a mixture of aluminum hydroxide and calcium hydroxide is used as the treatment agent for decomposing the fluorine-containing compounds and so on. The decomposing treatment agent used in the method of the present invention can be prepared by mixing aluminum hydroxide and calcium hydroxide together and subjecting the mixture to treatment such as granulation. However, so that the decomposition of the fluorine-containing compounds and so on can be carried out more efficiently, as the decomposing treatment agent, it is preferable to form an agglomerate having aluminum hydroxide particles as a nucleus with calcium hydroxide fine particles attached to the surface thereof. If a decomposing treatment agent of a form in which calcium hydroxide fine particles are attached to the surface of aluminum hydroxide nucleus particles is made to contact with a gas containing fluorine-containing compounds and so on in this way, then PFCs, acidic gas components and so on in the gas first react with the aluminum hydroxide to produce HF. The HF produced then immediately reacts with the calcium hydroxide fine particles present on the surface of the aluminum hydroxide particles, and is thus rapidly converted into calcium fluoride. By using a mixture of aluminum hydroxide and calcium hydroxide having such a form, the decomposition reaction of the fluorine-containing compounds and so on can be made to proceed very efficiently at a lower temperature than with a conventional method.

The agglomerate in which calcium hydroxide fine particles are attached to the surface of aluminum hydroxide nucleus particles can be formed by, for example, mixing calcium hydroxide fine particles and aluminum hydroxide particles together as a powder, and then adding water and mixing, extruding and granulating, and drying the granules. In the agglomerate having such a form, the particle diameter ratio between the particle diameter of the aluminum hydroxide particles in the center and the particle diameter of the calcium hydroxide fine particles on the outside is preferably in a range of 5:1 to 20:1. Moreover, the particle diameter of the aluminum hydroxide particles in the center is preferably 50 to 100 μm, more preferably 60 to 90 μm, and the particle diameter of the calcium hydroxide fine particles on the outside is preferably 3 to 10 μm, more preferably approximately 5 μm. For example, by carrying out granulation by the method described above using calcium hydroxide fine particles having a particle diameter of approximately 5 μm and aluminum hydroxide particles having a particle diameter of approximately 60 μm or more, an agglomerate of a form in which calcium hydroxide fine particles are attached to the surface of aluminum hydroxide nucleus particles that can be used in the present invention can be formed. Moreover, the ratio (molar ratio) between the aluminum hydroxide and the calcium hydroxide in the agglomerate is preferably in a range of 3:7 to 7:3, most preferably approximately 4:6.

In the method of the present invention, the temperature when making the gas to be treated containing fluorine-containing compounds and so on contact with the mixture of aluminum hydroxide and calcium hydroxide to bring about reaction is generally 500 to 800° C., preferably 600 to 700° C., most preferably approximately 650° C.

Moreover, in another embodiment of the present invention, a first stage column and a second stage column each packed with a mixture of aluminum hydroxide and calcium hydroxide may be set up in series, the temperatures of the two columns being made to be different, and a gas to be treated may be passed through the first stage column and the second stage column in series. Out of PFCs, in particular $C_4F_8$ and so on require a higher temperature for decomposition than $CF_4$, $C_2F_6$ and so on, and hence in the case that such PFCs that require a high temperature for decomposition are contained in the gas to be treated, the treatment temperature must be raised. However, if the treatment temperature is raised, then not only will this be disadvantageous from the viewpoint of energy consumption, but moreover some of the aluminum hydroxide and the calcium hydroxide will undergo a dehydration reaction to become aluminum oxide and calcium oxide respectively, and hence there will be a problem of the reactivity dropping. In such a case, if two treatment columns each packed with a mixture of aluminum hydroxide and calcium hydroxide are set up in series, and the treatment temperature of the first stage treatment column is set low so that PFCs such as $CF_4$ and $C_2F_6$ that can be decomposed sufficiently at a low temperature and also CO and acidic gases are decomposed, and then the treatment temperature of the second stage treatment column is set high so that $C_4F_8$ and so on that could not be decomposed in the first stage treatment column are decomposed, then all of the types of fluorine-containing compounds and so on targeted for decomposition can be decomposed efficiently, while saving energy and also preventing dehydration of the aluminum hydroxide and calcium hydroxide. In the case of carrying out the treatment in two stages in this way, the reaction temperature in the first stage is preferably 500 to 700° C., more preferably 600 to 700° C., most preferably approximately 650° C., and the reaction temperature in the second stage is preferably 650 to 800° C., more preferably 700 to 800° C., most preferably approximately 750° C.; the temperature in the second stage treatment column is preferably made to be 50 to 150° C. higher than the temperature in the first stage treatment column.

Furthermore, by adopting a constitution in which there are two treatment columns in this way, even in the case that the treatment agent becomes depleted in the first stage treatment column and hence small amounts of the substances to be decomposed leak out therefrom without being decomposed, these can be decomposed in the second stage treatment column. The treatment agent (the mixture of aluminum hydroxide and calcium hydroxide) in the first stage treatment column can thus be used until the capability thereof is completely used up. The frequency of replacement of the treatment agent in the column can thus be greatly reduced, and hence the running cost can be greatly reduced. Note that in the case of providing two treatment columns with this objective, the reaction temperatures of the first stage treatment column and the second stage treatment column may be set to be the same as one another.

A conceptual drawing of a gas treatment apparatus able to implement the method according to an embodiment of the present invention is shown in FIG. 1. This apparatus comprises a reaction column 2, a gas introduction pipe 1 through which the gas to be treated is introduced into the reaction column 2, and an exhaust pipe 4 through which the gas produced after the reaction is discharged from the reaction column 2. A treatment agent 3 comprising a mixture of aluminum hydroxide and calcium hydroxide is packed into the reaction column 2. A heating apparatus 5 is disposed around the periphery of the reaction column 2, whereby the inside of the reaction column 2 is heated to and kept at a prescribed temperature. The gas to be treated containing fluorine-containing compounds and so on is introduced through the gas introduction pipe 1 into the reaction column 2, and is thus made to contact with the mixture of aluminum hydroxide and calcium hydroxide which is at a prescribed heating temperature, whereby fluorine-containing compounds such as PFCs, acidic gases and oxidizing gases in the gas to be treated are decomposed through the reactions described earlier. $CO_2$, $H_2O$ and so on produced through the reactions are discharged through the exhaust pipe 4. Moreover, the treatment agent in the reaction column 2 is converted into a mixture of aluminum oxide and calcium fluoride through the reactions and remains in the reaction column 2. After use, the treatment agent may be removed, and the calcium fluoride may be separated off and recovered, and then treated with an acid or the like, thus producing fluorine gas from the calcium fluoride. According to the apparatus of the present invention, fluorine can thus be recovered in a reusable form very easily from a gas containing fluorine-containing compounds. Note that in the case that CO is contained in the gas to be treated, or the case that it is thought that CO might be produced through the treatment reaction, oxygen can be added to the gas to be treated via an oxygen supply pipe 6, whereby oxidation of the CO into $CO_2$ can be carried out at the same time in the reaction column 2.

Figure 2:
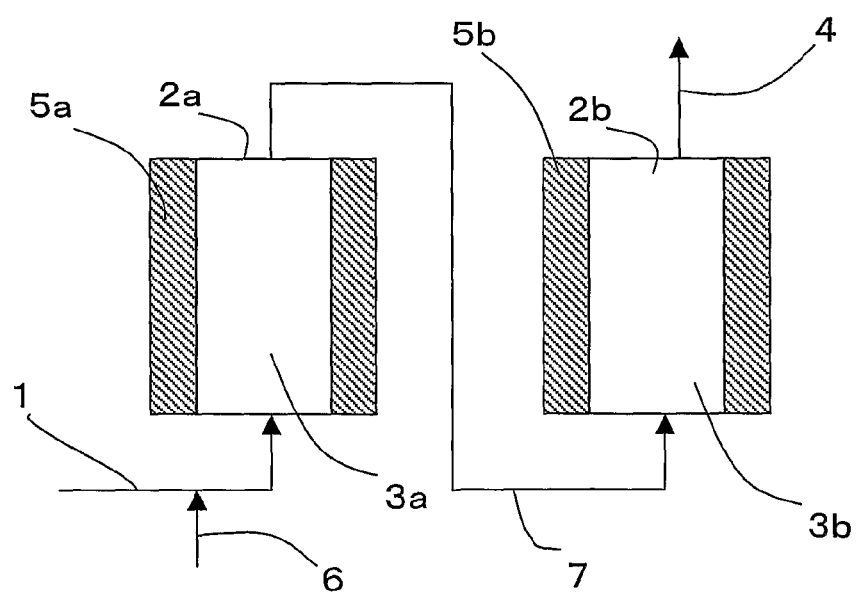
FIG. 2 is a conceptual drawing of a gas treatment apparatus according to another embodiment of the present invention.

Moreover, a conceptual drawing of a gas treatment apparatus able to implement two-stage treatment according to another embodiment of the present invention is shown in FIG. 2. In FIG. 2, constituent elements the same as ones in the apparatus shown in FIG. 1 are represented by the same reference numerals as in FIG. 1, and description thereof will be omitted here. Treatment agents 3a and 3b each comprising a mixture of aluminum hydroxide and calcium hydroxide are packed respectively into reaction columns 2a and 2b. The insides of the first stage reaction column 2a and the second stage reaction column 2b are set respectively to prescribed temperatures for the two-stage treatment as described earlier using heating apparatuses 5a and 5b. For example, the first stage reaction column 2a can be set to approximately 650° C., and the second stage reaction column 2b to approximately 750° C. A gas to be treated containing fluorine-containing compounds such as PFCs, acidic gases and so on is introduced through a gas introduction pipe 1 into the first stage reaction column 2a. In the first stage reaction column 2a, the gas to be treated is made to contact with the mixture of aluminum hydroxide and calcium hydroxide at a temperature of approximately 650° C., whereby the acidic gases, and those PFCs that can be decomposed at a relatively low temperature such as $CF_4$ and $C_2F_6$ are decomposed. The gas is then introduced into the second stage reaction column 2b through a connecting pipe 7. In the second stage reaction column 2b, PFCs such as $C_4F_8$ that require a high temperature for decomposition, and substances to be decomposed that were not completely decomposed in the first stage reaction column 2a but rather leaked out therefrom are then decomposed at a temperature of approximately 750° C.

The present invention also relates to apparatuses for treating a gas containing fluorine-containing compounds as described above.

Moreover, as described above, according to the method of the present invention, a gas containing fluorine-containing compounds and so on may be treated, whereby fluorine can be recovered in a reusable form. Another embodiment of the present invention thus relates to a method and apparatus for recovering fluorine from a gas containing fluorine-containing compounds, characterized by using a mixture of aluminum hydroxide and calcium hydroxide.

Various embodiments of the present invention are as follows.

1. A method of treating a gas containing a fluorine-containing compound, comprising contacting the gas with a treatment agent comprising a mixture of aluminum hydroxide and calcium hydroxide.

2. A method of carrying out decontamination treatment on a gas containing at least one selected from the group consisting of fluorine-containing compounds, oxidizing gases and acidic gases, comprising contacting the gas with a treatment agent comprising a mixture of aluminum hydroxide and calcium hydroxide.

3. A method of carrying out decontamination treatment on a gas containing at least one selected from the group consisting of fluorine-containing compounds, oxidizing gases, acidic gases and CO, comprising adding oxygen to the gas and making the gas contact with a treatment agent comprising a mixture of aluminum hydroxide and calcium hydroxide.

4. The method according to any of items 1 to 3 above, wherein the mixture of aluminum hydroxide and calcium hydroxide is in the form of an agglomerate in which calcium hydroxide fine particles are attached to the surface of aluminum hydroxide particles.

5. The method according to any of items 1 to 4 above, wherein the gas containing a fluorine-containing compound is made to contact with the treatment agent comprising a mixture of aluminum hydroxide and calcium hydroxide at a temperature of 550 to 850° C.

6. The method according to any of items 1 to 4 above, wherein the gas containing a fluorine-containing compound is initially made to contact with the treatment agent comprising a mixture of aluminum hydroxide and calcium hydroxide at a temperature of 500 to 700° C., and is then made to contact with the treatment agent comprising a mixture of aluminum hydroxide and calcium hydroxide at a temperature 50 to 150° C. higher than initially in a range of 650 to 800° C.

7. An apparatus for treating a gas containing a fluorine-containing compound, comprising:
a treatment column comprising a hollow interior that is packed with a treatment agent comprising a mixture of aluminum hydroxide and calcium hydroxide and through which the gas can pass, heating means capable of heating the hollow interior to a prescribed temperature, a gas introduction port for introducing the gas into the hollow interior, and an exhaust pipe for discharging gas produced from the hollow interior.

8. An apparatus for carrying out decontamination treatment on a gas containing at least one selected from the group consisting of fluorine-containing compounds, oxidizing gases and acidic gases, comprising:
a treatment column comprising a hollow interior that is packed with a treatment agent comprising a mixture of aluminum hydroxide and calcium hydroxide and through which the gas can pass, heating means capable of heating the hollow interior to a prescribed temperature, a gas introduction port for introducing the gas into the hollow interior, and an exhaust pipe for discharging gas produced from the hollow interior.

9. An apparatus for carrying out decontamination treatment on a gas containing at least one selected from the group consisting of fluorine-containing compounds, oxidizing gases, acidic gases and CO, comprising:
a treatment column comprising a hollow interior that is packed with a treatment agent comprising a mixture of aluminum hydroxide and calcium hydroxide and through which the gas can pass, heating means capable of heating the hollow interior to a prescribed temperature, a gas introduction port for introducing the gas into the hollow interior, and an exhaust pipe for discharging gas produced from the hollow interior; and
means for adding oxygen to the gas before the gas is introduced into the treatment column or an oxygen introduction pipe for introducing oxygen into the treatment column.

10. The apparatus according to any of items 7 to 9 above, wherein the mixture of aluminum hydroxide and calcium hydroxide is in the form of an agglomerate in which calcium hydroxide fine particles are attached to the surface of aluminum hydroxide particles.

11. The apparatus according to any of items 7 to 10 above, wherein the hollow interior of the treatment column is heated to 550 to 850° C.

12. The apparatus according to any of items 7 to 10 above, having a first stage treatment column and a second stage treatment column that each have a hollow interior and are connected together in series, wherein the hollow interior of the first stage treatment column is heated to 500 to 700° C., and the hollow interior of the second stage treatment column is heated to a temperature 50 to 150° C. higher than the temperature of the hollow interior of the first stage treatment column in a range of 650 to 800° C.

13. A method of treating a gas containing a fluorine-containing compound and recovering fluorine, comprising contacting the gas with a treatment agent comprising a mixture of aluminum hydroxide and calcium hydroxide.

14. The method according to item 13 above, wherein the mixture of aluminum hydroxide and calcium hydroxide is in the form of an agglomerate in which calcium hydroxide fine particles are attached to the surface of aluminum hydroxide particles.

15. The method according to item 13 or 14 above, wherein the gas containing a fluorine-containing compound is made to contact with the treatment agent comprising a mixture of aluminum hydroxide and calcium hydroxide at a temperature of 550 to 850° C.

16. The method according to item 13 or 14 above, wherein the gas containing a fluorine-containing compound is initially made to contact with the treatment agent comprising a mixture of aluminum hydroxide and calcium hydroxide at a temperature of 500 to 700° C., and is then made to contact with the treatment agent comprising a mixture of aluminum hydroxide and calcium hydroxide at a temperature 50 to 150° C. higher than initially in a range of 650 to 800° C.

17. An apparatus for treating a gas containing a fluorine-containing compound and recovering fluorine, comprising:

a treatment column comprising a hollow interior that is packed with a treatment agent comprising a mixture of aluminum hydroxide and calcium hydroxide and through which the gas can pass, heating means capable of heating the hollow interior to a prescribed temperature, a gas introduction port for introducing the gas into the hollow interior, and an exhaust pipe for discharging gas produced from the hollow interior.

18. The apparatus according to item 17 above, wherein the mixture of aluminum hydroxide and calcium hydroxide is in the form of an agglomerate in which calcium hydroxide fine particles are attached to the surface of aluminum hydroxide particles.

19. The apparatus according to item 17 or 18 above, wherein the hollow interior of the treatment column is heated to 550 to 850° C.

20. The apparatus according to item 17 or 18 above, having a first stage treatment column and a second stage treatment column that each have a hollow interior and are connected together in series, wherein the hollow interior of the first stage treatment column is heated to 500 to 700° C., and the hollow interior of the second stage treatment column is heated to a temperature 50 to 150° C. higher than the temperature of the hollow interior of the first stage treatment column in a range of 650 to 800° C.

The present invention will now be described more concretely through the following examples. The following merely gives several examples that realize the technical idea of the present invention, but the present invention is not limited thereby.

Example 1

49 mL of a mixed molded material (columnar in shape, diameter 2.9 mm×height 2 to 6 mm) of $Al(OH)_3$ and $Ca(OH)_2$ was packed into an SUS minicolumn (diameter 25 mm×height 150 mm). The mixed molded material was formed by mixing $Ca(OH)_2$ fine particles having a particle diameter of approximately 5 μm and $Al(OH)_3$ particles having a particle diameter of approximately 60 μm or more together as a powder, and then adding water and mixing, extruding and granulating, and drying the granules, and was in the form of an agglomerate having aluminum hydroxide particles having a particle diameter of approximately 60 μm as a nucleus with calcium hydroxide fine particles having a particle diameter of approximately 5 μm attached therearound (aluminum hydroxide to calcium hydroxide molar ratio=4:6). The column was put into a ceramic electric tube furnace. A thermocouple was inserted into a central part of the treatment vessel, and the temperature was controlled to 650° C. Once the treatment vessel had stabilized at 650° C., an $N_2$-based gas with a $CF_4$ inflow concentration adjusted to 1.0% was passed through the column at 410 mL/min. The column outlet gas was analyzed using a gas chromatograph mass spectrometer (AGS-7000U manufactured by Anelva) and an FT-IR analyzer (Infinity 6000 manufactured by Matson), thus measuring the concentrations of $CF_4$ and HF in the gas.

After passing the gas through for 6 hours, the $CF_4$ concentration in the column outlet gas was 95 ppm, and the removal rate as determined from the following formula was 99.1%. HF was not detected in the outlet gas.

$CF_4$ removal rate=($CF_4$ inflow concentration−$CF_4$ outlet concentration)/$CF_4$ inflow concentration× 100

Example 2

Two SUS minicolumns having the same dimensions as that used in Example 1 were prepared, 49 mL of the same mixed molded material of $Al(OH)_3$ and $Ca(OH)_2$ as in Example 1 was packed into each column, and each column was put into a ceramic electric tube furnace. The two columns were connected together in series, and the temperature was controlled to 650° C. for the first column and 750° C. for the second column. An $N_2$-based gas with a $CF_4$ inflow concentration adjusted to 520 ppm and a $C_4F_8$ inflow concentration adjusted to 1210 ppm was passed through the columns at 410 mL/min. The column outlet gases were analyzed as in Example 1.

The outlet gas analysis results and removal rates for each column after passing the gas through for 6 hours are shown in Table 1. $CF_4$ was removed in the first column, but the $C_4F_8$ removal rate was low. However, the $C_4F_8$ removal rate increased to 99.96% for the second column. At this time, HF was not detected in the outlet gas from either of the two columns.

TABLE 1

Results for Example 2

|  |  | First column outlet gas | Second column outlet gas |
|---|---|---|---|
| Outlet concentration (ppm) | $CF_4$ | 0.38 | <0.2 |
|  | $C_4F_8$ | 890 | 0.46 |
|  | HF | <1 | <1 |
| Removal rate (%) | $CF_4$ | 99.9 | 100 |
|  | $C_4F_8$ | 26.4 | 99.96 |

Example 3

Two SUS minicolumns having the same dimensions as that used in Example 1 were prepared, 49 mL of the same mixed molded material of $Al(OH)_3$ and $Ca(OH)_2$ as in Example 1 was packed into each column, and each column was put into a ceramic electric tube furnace. The two columns were connected together in series, and the temperature was controlled to 650° C. for the first column and 750° C. for the second column. An $N_2$-based gas with the inflow concentration adjusted to 550 ppm for $CF_4$, 1200 ppm for $C_4F_8$, 320 ppm for $C_2F_6$, 440 ppm for $SiF_4$, 3.2% for CO and 4.1% for $O_2$ was passed through the columns at 410 mL/min. The column outlet gases were analyzed as in Example 1.

The outlet gas analysis results and removal rates for each column are shown in Table 2. A high removal rate was obtained at the outlet of the second column for all of the PFCs, $SiF_4$, HF and CO.

TABLE 2

Results for Example 3

| | | Time for which gas passed (hr) | | | | | |
|---|---|---|---|---|---|---|---|
| | | 1 | 4 | 7 | 8 | 12 | 16 |
| First column outlet gas | | | | | | | |
| Outlet concentration (ppm) | $C_4F_8$ | 870 | 1010 | 940 | 940 | 920 | 920 |
| | $C_2F_6$ | 13 | 46 | 40 | 63 | 63 | 74 |
| | $CF_4$ | 16 | 18 | 71 | 1.6 | 3.2 | 6.5 |
| | CO | 5 | 90 | 700 | 960 | 1600 | 3000 |
| | $CO_2$ | 8300 | 4450 | 17700 | 32300 | 33200 | 32600 |
| | $SiF_4$ | <1 | <1 | <1 | <1 | <1 | <1 |
| | HF | <1 | <1 | <1 | <1 | <1 | <1 |
| Removal rate (%) | $C_4F_8$ | 29.8 | 18.5 | 24.2 | 24.2 | 25.8 | 25.8 |
| | $C_2F_6$ | 95.9 | 85.6 | 87.5 | 83.4 | 80.3 | 76.9 |
| | $CF_4$ | 97.1 | 96.7 | 87.1 | 99.7 | 97.1 | 96.9 |
| Second column outlet gas | | | | | | | |
| Outlet concentration (ppm) | $C_4F_8$ | 72 | 83 | 79 | 54 | 46 | 51 |
| | $C_2F_6$ | 5.9 | 24 | 26 | 4.9 | 6.0 | 8.8 |
| | $CF_4$ | 6.4 | 5.5 | 8.0 | <0.2 | <0.2 | <0.2 |
| | CO | <2 | <2 | <2 | <2 | <2 | <2 |
| | $CO_2$ | 11600 | 7680 | 19700 | 35900 | 39300 | 38600 |
| | $SiF_4$ | <1 | <1 | <1 | <1 | <1 | <1 |
| | HF | 4 | <1 | <1 | <1 | <1 | <1 |
| Removal rate (%) | $C_4F_8$ | 94.2 | 93.3 | 93.6 | 95.6 | 96.3 | 95.9 |
| | $C_2F_6$ | 98.2 | 92.5 | 91.9 | 98.5 | 98.1 | 97.3 |
| | $CF_4$ | 98.8 | 99.2 | 99.3 | 100 | 100 | 100 |

Industrial Applicability

According to the present invention, a gas containing fluorine-containing compounds can be treated at a lower temperature than with a conventional method using aluminum oxide, whereby the fluorine-containing compounds such as PFCs and so on can be decomposed, and moreover the fluorine can be recovered in a reusable form; there is thus a contribution to fluorine recycling, and the industrial value is great.

The invention claimed is:

1. A method of treating a gas containing a fluorine-containing compound, comprising:
    contacting a gas including at least one fluorine-containing compound with a treatment agent at a temperature of 550 to 850° C.,
    wherein the at least one fluorine-containing compound comprises at least one of a fluorinated hydrocarbon and a perfluoro compound, the treatment agent comprises an agglomerate including calcium hydroxide particles attached to surfaces of aluminum hydroxide particles, the calcium hydroxide particles have a particle diameter of 3-10 μm, and the aluminum hydroxide particles have a particle diameter of 50-100 μm.

2. A method of decontaminating a gas, comprising:
    adding oxygen to a gas including (a) at least one of a fluorinated hydrocarbon and a perfluoro compound and (b) at least one of CO and a compound that produces CO during a decontamination of the gas; and
    contacting said gas with a treatment agent at a temperature of 550 to 850° C. to produce calcium fluoride, wherein the treatment agent comprises an agglomerate including calcium hydroxide particles attached to surfaces of aluminum hydroxide particles, the calcium hydroxide particles have a particle diameter of 3-10 μm, and the aluminum hydroxide particles have a particle diameter of 50-100 μm.

3. A method of treating a gas including a fluorine-containing compound, comprising:
    contacting a gas including at least one fluorine-containing compound with a treatment agent at a first temperature of 500 to 700° C.; and
    contacting the gas, treated at the first temperature, with the treatment agent at a second temperature of 650 to 800° C.,
    wherein the at least one fluorine-containing compound comprises at least one of a fluorinated hydrocarbon and a perfluoro compound, said treatment agent comprises an agglomerate including calcium hydroxide particles attached to surfaces of aluminum hydroxide particles, the calcium hydroxide particles have a particle diameter of 3-10 μm, the aluminum hydroxide particles have a particle diameter of 50-100 μm, and the second temperature is higher than the first temperature by 50 to 150° C.

4. A method of recovering a fluorine value from a gas, comprising:
    contacting a gas including at least one fluorine-containing compound with a treatment agent at a temperature of 550 to 850° C. to produce calcium fluoride,
    wherein the at least one fluorine-containing compound comprises at least one of a fluorinated hydrocarbon and a perfluoro compound, the treatment agent comprises an agglomerate including calcium hydroxide particles attached to surfaces of aluminum hydroxide particles, the calcium hydroxide particles have a particle diameter of 3-10 μm, and the aluminum hydroxide particles have a particle diameter of 50-100 μm.

5. A method of recovering a fluorine value in a form of calcium fluoride from a gas, comprising:
    contacting a gas including at least one fluorine-containing compound with a treatment agent at a first temperature of 500 to 700° C.; and
    contacting the gas, treated at the first temperature, with the treatment agent at a second temperature of 650 to 800° C.,
    wherein the at least one fluorine-containing compound comprises at least one of a fluorinated hydrocarbon and a perfluoro compound, said treatment agent comprises an agglomerate including calcium hydroxide particles attached to surfaces of aluminum hydroxide particles, the calcium hydroxide particles have a particle diameter of 3-10 μm, the aluminum hydroxide particles have a particle diameter of 50-100 μm, the second temperature is higher than the first temperature by 50 to 150° C., and the contacting of the gas at the first and second temperatures produces calcium fluoride.

6. A method of decontaminating a gas, comprising:
    adding oxygen to a gas including (a) at least one of a fluorinated hydrocarbon and a perfluoro compound and (b) at least one of CO and a compound that produces CO during a decontamination of the gas;
    contacting the gas with a treatment agent at a first temperature of 500 to 700° C.; and contacting the gas, treated at the first temperature, with the treatment agent at a second temperature of 650 to 800° C., wherein the treatment agent comprises an agglomerate including calcium hydroxide particles attached to surfaces of aluminum hydroxide particles, the calcium hydroxide particles have a particle diameter of 3-10 μm, the aluminum hydroxide particles have a particle diameter of 50-100 μm, the second temperature is higher than the first temperature by 50 to 150° C., and the contacting of the gas at the first and second temperatures produces calcium fluoride.

* * * * *